Feb. 12, 1963 J. W. GRAY 3,077,567
VARIABLE FREQUENCY MULTIVIBRATOR
Filed March 23, 1960
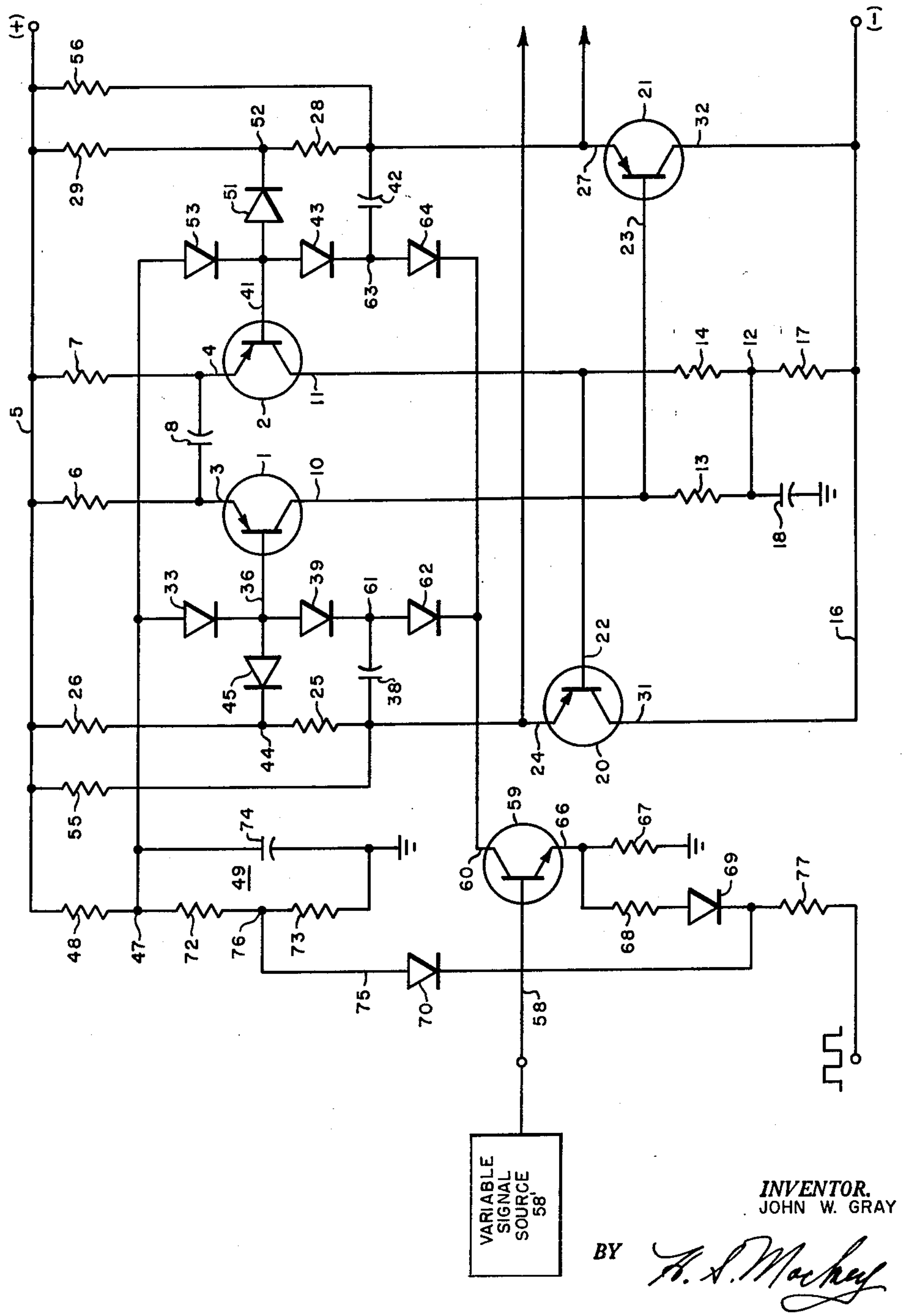
*INVENTOR.*
JOHN W. GRAY
*BY* H. S. Mackey
ATTORNEY.

United States Patent Office 3,077,567

Patented Feb. 12, 1963

3,077,567

VARIABLE FREQUENCY MULTIVIBRATOR

John W. Gray, Pleasantville, N.Y., assignor to General Precision, Inc., a corporation of Delaware Filed Mar. 23, 1960, Ser. No. 17,191

7 Claims. (Cl. 332—16)

This invention relates to multivibrators and more particularly to multivibrators in which the frequency of operation may be varied linearly.

The principal object of this invention is to provide a multivibrator in which the output frequency may be varied linearly, over a wide range, in response to electric signals from an external signal source.

Another important object of this invention is to provide a multivibrator as set forth above in which the output frequency may be modulated by a fixed percentage of the output frequency as determined by the said electric signal without otherwise affecting the linearity of operation.

The invention contemplates a multivibrator circuit comprising, at least two electric valves each of which conducts in alternate half cycles of operation, circuit means for connecting the output of one of said valves to the control electrode of said other valve and the output of said other valve to the control electrode of said one valve, said means including a pair of electric storage devices for alternately maintaining each valve in a non-conductive condition, means responsive to an electric signal source for providing a constant current corresponding in magnitude to the magnitude of the signal from the source, and means connecting said electric storage device to the source of constant current so that said constant current source is the sole determinant of the time required to alternately discharge each of said storage means to effectively control the frequency of operation of the multivibrator as a linear function of the magnitude of the constant current.

The foregoing and other objects and advantages of the invention will appear more clearly from a consideration of the specification and drawing wherein one embodiment of the invention is described and shown in detail for illustration purposes only.

The single FIGURE is a schematic diagram of a novel multivibrator constructed in accordance with the invention.

Two identical transistors 1 and 2 each have their emitters 3 and 4 respectively, connected to a source of positive potential 5 by similar resistors 6 and 7, respectively. The emitters are connected togther by a capacitor 8 to afford the coupling necessary for proper regenerative operation, at the same time insuring substantially equal direct currents regardless of slight variations between transistors 1 and 2. Collectors 10 and 11 of transistors 1 and 2, respectively, are connected to a terminal 12 by resistors 13 and 14, respectively; and terminal 12 is connected to a source of negative voltage 16 by a resistor 17 and to ground by a capacitor 18.

Another pair of similar transistors 20 and 21 have their bases 22 and 23 connected to collectors 11 and 10, respectively. The emitter 24 of transistor 20 is connected to source 5 by a pair of series connected resistors 25 and 26 and the emitter 27 of transistor 21 is also connected to source 5 by another pair of series connected resistors 28 and 29. The collectors 31 and 32 of transistors 20 and 21, respectively, are both connected to negative source 16.

Emitter 24 of transistor 20 is connected to the base 36 of transistor 1 by a series connected capacitor 38 and a diode 39 which has its anode connected to base 36 and its cathode connected to one side of capacitor 38. Emitter 27 of transistor 21 is connected to the base 41 of transistor 2 by a series connected capacitor 42 and a diode 43 which has its anode connected to base 41 and its cathode connected to one side of capacitor 42.

Base 36 of transistor 1 is connected to a terminal 44, which is located at the common junction of resistors 25 and 26, by a diode 45 which has its anode connected to the base. Base 36 is also connected to a terminal 47 by another diode 33 which has its cathode connected to the base. Terminal 47 is a reference voltage point situated between ground potential and the potential of source 5. It is connected to source 5 by a resistor 48 and to ground by a RC circuit 49. A diode 51 connects base 41 of transistor 2 to a terminal 52 which is located at the common junction of resistors 28 and 29. Diode 51 has its anode connected to the base 41 of transistor 2 and its cathode to terminal 52. Base 41 is also connected to terminal 47 by another diode 53 which has its cathode connetced to the base. Emitters 24 and 27 of transistors 20 and 21 are connected to source 5 by a pair of bias resistors 55 and 56, respectively.

The electric control signal referred to previously is a direct current voltage which may be derived in any of a number of different ways. It may be the output of an integrator which integrates an error signal. It may be the output of a potentiometer which is positioned by an error signal or a control device such as the rudder of an aircraft. Therefore, no specific source other than the source 58' has been shown, but the signal, a D.C. voltage which may vary from about 1 volt to about 12 or more volts is applied to the base 58 of a transistor 59 which has its collector 60 connected to the common junction 61 of capacitor 38 and diode 39 by a diode 62 and to the common junction 63 of capacitor 42 and diode 43 by another diode 64. Diodes 62 and 64 have their cathodes connected to collector 60 and their anodes to junctions 61 and 63, respectively. The emitter 66 of transistor 59 is connected to ground by a resistor 67.

Circuit 49 has two series connected resistors 72 and 73 connected between terminal 47 and ground and a by-pass capacitor 74 connected in parallel with resistors 72 and 73. Resistor 73 has a value of only a few ohms and the small voltage across it is applied to the anode of a diode 70 by a conductor 75 which connects the common junction 76 of resistors 72 and 73 to the anode of the diode 70. The reason for this connection will appear later. Emitter 66 is connected to one side of a resistor 68 the other side of which is connected to the anode of a diode 69. The cathodes of diodes 69 and 70 are both connected through a common resistor 77 to a square wave generator not shown. The square wave supplied through resistor 77 connects resistor 68 in parallel with resistor 67 during the negative half cycle of the square wave to alternately change the resistance between emitter 66 and ground. The small bias voltage applied to the anode of diode 70 compensates for the inequality of the currents through diodes 69 and 70 at low frequencies to assure that the emitter resistance will vary by the same amount under all operating conditions.

The current through collector 60, with the arrangement shown, is influenced by the voltage applied to base 58 and by the emitter resistance. This current is used to regulate the frequency of the multivibrator. Thus, the input of D.-C. voltage to base 58 determines the average frequency of the multivibrator. In addition, the frequency of the square wave source determines the frequency at which the multivibrator output is modulated since the effective resistance placed in parallel with resistor 67 on the negative half cycle of the square wave determines the amount of frequency modulation.

The circuit operation is in certain respects similar to the operation of conventional free running multivibrators. For explanation purposes we will assume that transistor 1 is conducting and transistor 2 is non-conducting. Under these conditions the collector voltage of transistor 1 rises since the voltage drop across resistor 13 follows the emitter current. This higher voltage is applied to the base 23 of transistor 21 which is connected as an emitter follower. Thus the emitter 27 voltage rises and the voltage of terminal 63 rises also. This voltage is greater than the voltage of terminal 47, therefore, diodes 43 and 53 are back biased. Diode 51 is also back biased because the potential of junction point 52 rises above that of point 47. The voltage at terminal 63 is also greater than that at terminal 61 and diode 64 is forward biased while diode 62 is back biased. The charge on condenser 42 flows out through transistor 59 to ground.

When the voltage at terminal 63 falls below that at terminal 47 diodes 43 and 53 are again forward biased and current flows into condenser 42 and when the base 41 potential falls below the potential of collector 4 transistor 2 starts conducting. This results in a repetition of the process described but with respect to transistor 1.

This circuit may be constructed using the following values.

| | |
|---|---|
| Resistors: | |
| **6** and **7** | 5.66K ohms. |
| **13** and **14** | 4.75K ohms. |
| **17** | 1.5K ohms. |
| **25, 26, 28** and **29** | 22K ohms. |
| **34** | 1.2K ohms. |
| **48** | 1.21K ohms. |
| **55** and **56** | 10K ohms. |
| **67** | 12.7K ohms. |
| **68** and **77** | 100K ohms. |
| **72** | 2K ohms. |
| **73** | 13K ohms. |
| Capacitors: | |
| **8** | 10 μf. |
| **18** and **74** | .01 μf. |
| **35** | .0033 μf. |
| **38** and **42** | 1000 μμf. |
| Transistors: | |
| **1, 2, 20** and **21** | 2N526. |
| **59** | 2N338. |
| Diodes: | |
| **33, 39, 43, 45, 51, 53, 62** and **64** | 1N627. |
| **69** and **70** | HD6778. |
| Voltage sources: | |
| **5** | (+) 25 volts D.C. |
| **16** | (−) 12 volts D.C. |
| Square wave input voltage to resistor **77** | 40 volts. |
| Peak to peak at 10 c.p.s. | |

With the values set forth above a D.C. voltage of (+) .1 is available at terminal 76 to bias diode 70 to compensate for current inequalities referred to previously. Also, the input voltage applied to the base 58 of transistor 59 may vary from about 1 volt to about 11 volts to provide frequency control between about 1.5 kc. to about 25 kc. and the modulation produced by switching resistor 68 will be about (±) 6% of the average output frequency over the entire frequency range.

When the circuit is constructed with the component values set forth above transistors 1 and 2 will be alternately conductive and non-conductive and 180° out of phase with each other. The switching frequency except for the modulation superimposed thereon by the square wave applied through resistor 77 is a function of the voltage applied to the base 58 of transistor 59. When this voltage is made to vary between about 1 volt and about 11 volts the switching frequency will vary linearly therewith between about 1.5 kc. and 25 kc. This is accomplished since the current in collector 60 is, under the limitation stated above, a linear function of the voltage applied to base 58, and the rate of discharge of capacitors 38 and 42 is a linear function of the current in the collector circuit. Therefore, since the rate of discharge of capacitors 38 and 42 controls the switching frequency the switching frequency is a linear function of the voltage applied to base 58. Diodes 62 and 64 isolate capacitors 38 and 42 from the collector circuit except during discharge. This isolation is primarily responsible for the linearity since the discharge path for each condenser is not influenced by the operation of other circuit elements and is solely a function of the collector current.

In the embodiment chosen for illustration a square wave voltage is applied to the emitter resistor network of transistor 59 to alternately change its resistance so as to modulate the frequency of the multivibrator output. In the event this modulation is not required the square wave source may be disconnected then the multivibrator frequency output will be determined solely by the magnitude of the voltage applied to the base of transistor 59.

If a current type signal source is available such as a photo sensitive device then transistor 60 and its emitter circuits are not needed. The current signal source would then be directly connected to the cathodes of diodes 62 and 64.

While only one embodiment of the invention has been shown and described in detail for illustration purposes it is to be expressly understood that the invention is not to be limited thereto.

What is claimed is:

1. A multivibrator circuit comprising a pair of transistors which conduct in alternate half cycles of multivibrator operation, each of said transistors having an output electrode and a control electrode, first means including a first condenser connecting the output electrode of one transistor to the control electrode of the other, second means including a second condenser connecting the output electrode of the said other transistor to the control electrode of the said one transistor, means responsive to a signal from an external source for providing a constant current source the magnitude of which corresponds to the signal from said external source, and means for alternately establishing two isolated discharge paths one between the first condenser and the constant current source and the second between the second condenser and the current source whereby the condensers are discharged at a rate which is determined solely by the magnitude of the current from said constant current source.

2. A multivibrator as set forth in claim 1 in which the means connected between the capacitors and the constant current source for alternately discharging the capacitors includes a pair of diodes having similar electrodes connected in common to the constant current source and their other electrodes connected to different ones of said capacitors.

3. A multivibrator comprising first and second transistors each having its emitter and collector connected to oppositely poled sources of bias potential, a third transistor having its base connected to the collector of the first transistor and its emitter and collector connected to oppositely poled sources of bias potential, a first series connected capacitor and diode network connected between the base of the second transistor and the emitter of the third transistor to provide a path between the collector of first transistor and the base of the second transistor, a fourth transistor having its base connected to the collector of the second transistor and its emitter and collector connected to oppositely poled sources of bias potential, a second series connected capacitor and diode network connected between the base of the first transistor and the emitter of the fourth transistor to provide a path between the collector of the second transistor and the base of the first transistor, means responsive to an electric signal from an external source for providing a constant current source having a magnitude which corresponds to the signal from the said external source, and means for alternately establishing two isolated discharge paths one between said first series connected capacitor and diode network and the constant current source and the second between said second series connected capacitor and diode network and the constant current source whereby the first and second capacitors are discharged at a rate determined by the magnitude of the current from said constant current source.

4. A multivibrator as set forth in claim 3 in which the means connected between the capacitors and the constant current source includes a pair of diodes having similar electrodes connected in common to the constant current source and their other electrodes connected to different ones of said capacitors.

5. A multivibrator comprising, at least two electric valves each of which conducts in alternate half cycles of multivibrator operation, first circuit means including an electric storage device for connecting the output electrode of one of said valves to the control electrode of the other, second circuit means including an electric storage device for connecting the output electrode of said other valve to the control electrode of said one valve, said first and second circuit means alternately maintaining the valves in a nonconductive condition, means responsive to a signal source for providing a constant current corresponding in magnitude to the magnitude of the signal from the source, and means for alternately establishing two isolated discharge paths, one between the first circuit means and the constant current source and the second between the second circuit means and the constant current source whereby the electric storage means associated with each of the circuit means is discharged at a rate which is determined solely by the magnitude of the current from said source.

6. A multivibrator circuit comprising a pair of transistors which conduct in alternate half cycles of multivibrator operation, each of said transistors having an output electrode and a control electrode, first means including a first condenser connecting the output electrode of one transistor to the control electrode of the other, second means including a second condenser connecting the output electrode of the said other transistor to the control electrode of the said one transistor, means responsive to a signal from an external source for providing a constant current source the magnitude of which corresponds to the signal from said external source, means for modulating the magnitude of the constant current at a predetermined frequency, and means for alternately es-establishing two isolated discharge paths one between the first condenser and the constant current source and the second between the second condenser and the current source whereby the condensers are discharged at a rate which is determined solely by the magnitude of the current from said constant current source.

7. A multivibrator comprising first and second transistors each having its emitter and collector connected to oppositely poled sources of bias potential, a third transistor having its base connected to the collector of the first transistor and its emitter and collector connected to oppositely poled sources of bias potential, a first series connected capacitor and diode network connected between the base of the second transistor and the emitter of the third transistor to provide a path between the collector of first transistor and the base of the second transistor, a fourth transistor having its base connected to the collector of the second transistor and its emitter and collector connected to oppositely poled sources of bias potential, a second series connected capacitor and diode network connected between the base of the first transistor and the emitter of the fourth transistor to provide a path between the collector of the second transistor and the base of the first transistor, means responsive to an electric signal from an external source for providing a constant current source having a magnitude which corresponds to the signal from the said external source, means for modulating the magnitude of the constant current at a predetermined frequency, and means for alternately establishing two isolated discharge paths one between said first series connected capacitor and diode network and the constant current source and the second between said second series connected capacitor and diode network and the constant current source whereby the first and second capacitors are discharged at a rate determined by the magnitude of the current from said constant current source.

References Cited in the file of this patent

UNITED STATES PATENTS

| | | |
|---|---|---|
| 2,633,535 | Daskam | Mar. 31, 1953 |
| 2,666,852 | Hollingsworth | Jan. 19, 1954 |
| 2,848,610 | Freienmuth | Aug. 19, 1958 |
| 3,010,078 | Stefanov | Nov. 21, 1961 |
| 3,022,469 | Bahrs et al. | Feb. 20, 1962 |

OTHER REFERENCES

Leece: Electronic Engineering, October 1958, page 615.